2 Sheets—Sheet 1.

S. PHILLIPS.
ADJUSTABLE DAMS FOR DEEPENING CHANNELS OF STREAMS.

No. 175,153. Patented March 21, 1876.

Witnesses.
L. Van Riswick.
D. C. Stuart

Inventor:
Samuel Phillips
per D. Hannay
att'y

N. PETERS, PHOTO-LITHOGRAPHER, WASHINGTON, D. C.

2 Sheets—Sheet 2.
S. PHILLIPS.
ADJUSTABLE DAMS FOR DEEPENING CHANNELS OF STREAMS.
No. 175,153. Patented March 21, 1876.
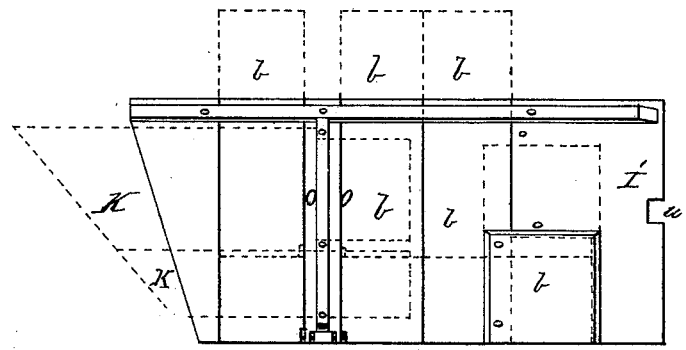
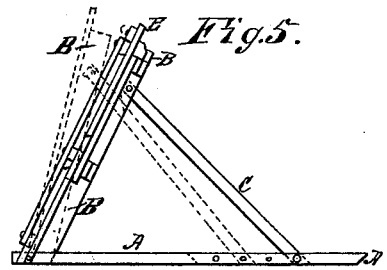
Witnesses.
L. Van Riswick.
D. G. Stuart.
Inventor.
Samuel Phillips
per P. Hannay
atty.

UNITED STATES PATENT OFFICE.

SAMUEL PHILLIPS, OF LAUREL, MARYLAND.

IMPROVEMENT IN ADJUSTABLE DAMS FOR DEEPENING THE CHANNELS OF STREAMS.

Specification forming part of Letters Patent No. 175,153, dated March 21, 1876; application filed March 1, 1876.

*To all whom it may concern:*

Be it known that I, SAMUEL PHILLIPS, of Laurel, in the county of Prince George and State of Maryland, have invented certain new and useful Improvements in Apparatus for Automatically Cleaning Out or Deepening the Channels of Streams, Canals, Mill-Races, &c.; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1:
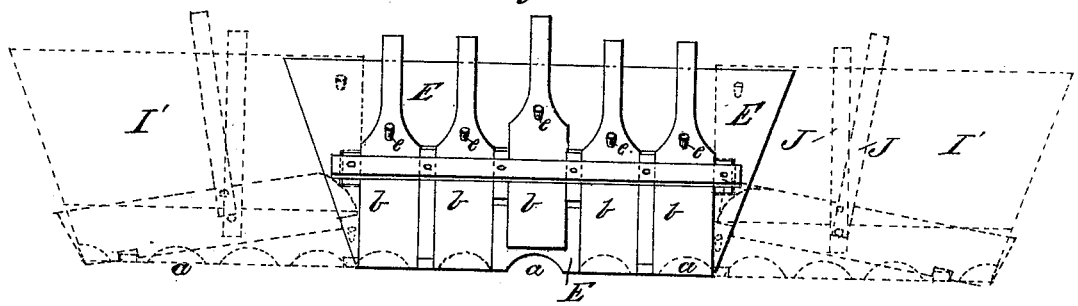
Figure 2:
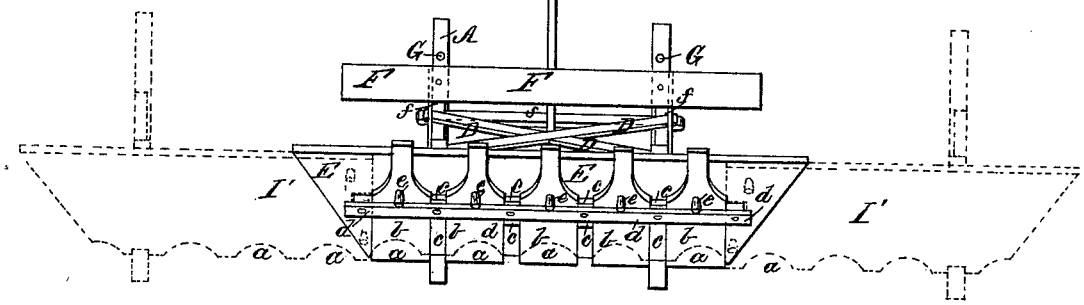

Figure 1 represents a front elevation of my excavator, showing in dotted lines the method of increasing its width by the application thereto of independent and removable sections. Fig. 2 represents a plan, and Fig. 3 a side elevation, of the same. Fig. 4 represents a plan, and Fig. 5 a side elevation, of a modification of the apparatus by which its width can be increased or diminished at will, and by which the angle of the face of the dam may be adjusted so as to increase or diminish, as may be required, the energy and action of the apparatus.

My invention relates to a new and useful apparatus for deepening and widening, or otherwise cleaning out, by the action of running water, any water-course, tunnel, ditch, canal, mill-race, mill-pond, river or stream, in which there is running water, the power exerted upon the apparatus to effect these purposes being simply that of the running water therein contained.

The invention consists in applying to the stream, mill-race, canal, &c., intended to be deepened or widened, a movable dam, so constructed as to extend from side to side of said stream, and of a height sufficient to dam the waters up, in order to give to them the necessary cutting-head or power when properly directed. It also consists in constructing the lower edge of the movable dam with notches or openings of any suitable form and size, and applying over these one or more slide or pivotal gates, in such manner that they can be shut down tight to prevent the escape of water through the bottom of the dam until a sufficient head of water has been collected for the effectual operation of the machine, after which, as many or all may be raised to allow the water to rush through these openings at the bottom of the dam, and thus cut away all mud, sand, or gravel in their way, thereby deepening the channel. As the mud, sand, or other obstructing material is thus cut away, the pressure of the water forces the dam itself to move along as fast as the obstruction is removed, and this action continues until the whole stream has been deepened.

It will be apparent that the sides of the ditch, canal, or stream may be widened as much as desired by the application of the same principles through suitable devices for the purpose. By a repetition of this operation the channel may be deepened or widened to any required degree, provided the nature of the soil is such as to render it subject to erosion by water under pressure.

My invention further consists in constructing my movable dam in detachable sections, so as to render it portable, and so as to render it easy to take apart and put together again. It also consists in combining with either or all of the sections adjustable slide-wings, by means of which they may be lengthened laterally, in order to adapt them to the width of stream, ditch, mill-race, &c., required, and which is peculiarly advantageous, where otherwise the addition of a whole section would render the width greater than the width desired.

To enable others to make, construct, and use my invention, I will now proceed to describe its parts in detail.

Figure 3:
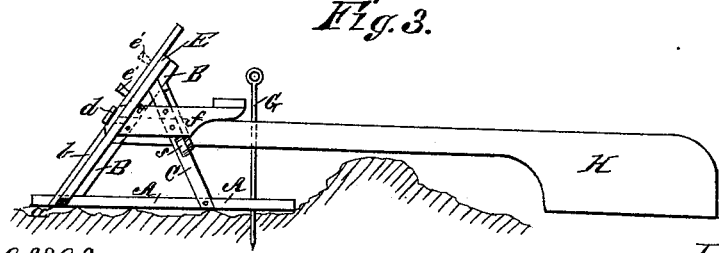

In Figs. 1, 2, and 3 is represented in full lines an apparatus adapted to the deepening of an ordinary mill-race, ditch, or small stream.

The frame consists of two or more sills, A, arranged at suitable intervals apart, to which are secured at their lower ends a corresponding number of strong timbers, B, set at any suitable angle, as in the ordinary mode of constructing dams; it only differing in this case that the angle is greater, because the pushing force of the water is desired to be exerted upon the dam, in order to move it along as the bottom of the channel is deepened, and thus keep it constantly up with its work; whereas in ordinary dams, the angle is generally so made, as that but little pushing force can be exerted upon it; otherwise it would endanger the stability of the dam.

C represents a system of braces for supporting the upper end of timbers B upon the sills A, there being one brace, C, for each timber B and sill A. D represents a system of diagonal braces to give greater stability, rigidity, and strength to the frame.

To the face of the inclined timbers B of the frame is secured in any suitable manner, by nails, spikes, screws, or screw bolts and nuts, the planks E which constitute the dam. The ends of these planks are cut off in such shape as to give the desired slope to the side of the banks to prevent future washing.

A very suitable shape is illustrated in the drawing; but that may be varied according to circumstances, or as may be deemed most advisable to secure the desired result.

The lower edge of the planking E of the dam is represented as being provided with a series of notches or cuts, $a$, over each of which is arranged a slide-gate, $b$. These gates $b$ are made to slide between guide-strips $c$, and are confined in position by a cross-bar, $d$, secured to the guide-strips $c$, and through them to the planking E. In each gate $b$ is made a hole, through which is passed a stop-pin, $e$, into the planking E. The planking E is provided with two holes for each gate, the one above the other. This allows a limited motion to the gates, but a motion sufficient to cover or uncover the openings $a$ in the bottom of the dam, as may be required. This is illustrated in Fig. 1, where the center gate is represented as being raised to uncover its opening $a$, while each of the others is represented as being depressed to cover their openings $a$. In this case the water would only cut at the center and not at the sides, while, if all were raised, the water would cut all the way across and deepen the channel evenly, from which it will be apparent that the operator may cut or deepen wherever desired. To this end a foot-board, F, is secured to the apparatus at the back of the dam for the support of the operator, supporting-arms $f$ for this purpose being secured to the timbers B and braces C.

If desired, the gates $b$ may be dispensed with, but I prefer their use; or only a single gate for each section may be used.

In order to prevent too rapid a movement of the dam, and to secure thorough work as it goes, I propose to use, whenever necessary, strong iron rods or bars G, which I pass through the rear end of the sills A down into the material of the bottom, and thus retard the movement of the dam. Sometimes it may be necessary to use one in each sill, and again it may only be necessary to use one at but one or two of the sills, according to the nature of the soil or material to be removed, as at one side it may yield quickly to the action of the water, while at the other, it being harder or more tenacious, it may only yield slowly, and hence the apparatus should be retarded at the side where it yields freely. What is true of the mode of using the rods is equally true of the mode of using the gates, as they must or should be used so as to direct the water most forcibly wherever required, and more sparingly where the material yields freely, and thus equalize their action and give an even movement to the apparatus relatively to the sides of the channel being deepened.

To this end also I propose to use, whenever required, a device which may be termed a "rudder" or "guide," H, at the rear of the dam, which, being acted on by the water as it rushes under the dam, will tend to hold the latter square with the course of the stream. This rudder is detachably connected to the frame-work of the machine, and so as to have a firm lateral hold upon the latter, and thus exert a controlling influence upon it under the action of the water. Its relation to the machine is illustrated in Figs. 2 and 3. The mode of applying it to the machine, so long as it can be rigidly yet detachably secured thereto, is not material, as that may be effected in any known way. For this purpose I prefer to attach it to the machine by inserting its squared end into a square socket formed in planking E, and then cutting a notch into its under side, so as to fit into a corresponding notch in the lateral brace $s$ of the frame, thus halving the two together, as it were. If desired, they may then be temporarily clamped together; but this is not absolutely necessary, as, by making the width of the rudder sufficiently great, its upper side may be made to bear against the under side of the diagonal braces D, which will give them all the necessary support.

In Figs. 1 and 2 is illustrated, in dotted lines, a method of increasing the width of the apparatus by the application of independent sections where the addition of one or two will suffice for the purpose. The additional sections I' are constructed by simply securing its planking E at one end to a single timber, B, sill A, and brace C, and then lapping its other end over the end of the main section I at its front side. In this position they are then secured to each other by passing two or more pins, $v$, through them. A portion of the inner end of the outer section I' is made to pass under the end of bar $d$, and is thus clamped to the other I. A small notch, $u$, Fig. 4, is cut in the inner end of the outer sections I', to fit over the end of the outer guide $c$ of section I; but that is not absolutely necessary. In these sections a modified form of gate, $b$, is shown as applied. In this case the gate is operated as on a pivot, its lower edge at one end being notched so as to fit over and turn on the sill, and has a handle or lever, J, attached thereto by which to operate it. This mode of operating the gate lessens the depth of cut at the sides.

Where the current is strong, or where the width to be excavated is great, or whenever desired, each section may be made like the main section I, in Figs. 1, 2, and 3, and put together in a manner similar to that shown in dotted lines. This will always insure sufficient rigidity and strength.

In Fig. 4 is shown a method of increasing the width of a section. The full lines show a section with different-shaped openings from that illustrated in Figs. 1 and 2. At its left-hand side, in dotted lines, is shown a slide-gate, K, capable of lateral extension or adjustment to increase the width of the section, so as to extend to the side of the stream. For this purpose the lateral gate K may be made in one or more pieces, the inner ends of which are made to pass under one or more vertically-arranged confining-bars, O, which suffice to retain them in position; but other devices may also be used for that purpose.

Fig. 4 also illustrates a system of slide-gates so arranged as to operate without the aid of a series of independent openings, a, in the bottom of planking E. By raising one the sides of the others form the openings; by raising them altogether it leaves a free opening across, along which the water cuts throughout its length.

In Fig. 5 is illustrated a method of adjusting the angle of the face of the dam, in order to adapt the apparatus to the conditions of the ditch or canal being operated on. Where there is plenty of water and a heavy current the inclination should be light, while where there is not much water and but little current the angle should be great, in order to derive impetus from the water, that the dam, as the bottom is deepened, may keep pace with the deepening. For this purpose the timbers B should be pivoted to the sills A, and the braces C made detachable at their lower ends, so as to be capable of being secured to sills A at different points, and thus increase or diminish the angle as circumstances may require.

Having described my invention, what I claim as new, and desire to secure by Letters Patent, is—

1. A movable dam, constructed with openings a at its lower edge, substantially as and for the purposes set forth.

2. A movable dam, provided with openings a at its lower edge, and with a gate or gates, b, substantially as and for the purposes set forth.

3. A movable dam, provided with openings a at its lower edge, and with a gate or gates, b, and foot-board F, substantially as for the purposes set forth.

4. A movable dam, provided with openings a at its lower edge, and with a gate or gates, b, and rods G, substantially as and for the purposes set forth.

5. A movable dam, provided with openings a at its lower edge, and with a guide or rudder, H, substantially as set forth.

6. The method, herein described, of combining, in a movable dam, two or more sections, I I', together—that is to say, by lapping the end of the one over that of the other, the end of one section being made to pass between the face of the other and the end of a bar, d, secured to the frame of the latter, the two being then fastened together by pins v, substantially as set forth.

7. In combination with a movable dam, one or more laterally-sliding gates, K, and vertical support-bar O, substantially as shown and described.

8. A movable dam, provided with pivoted timbers B and adjustable braces C, substantially as and for the purpose set forth.

In testimony that I claim the foregoing as my own I affix my signature in presence of two witnesses.

SAMUEL PHILLIPS.

Witnesses:
M. M. ROHRER,
S. A. FITCH.